Feb. 7, 1933.  W. R. SHERMAN  1,896,331
IRRIGATION GATE
Filed April 22, 1932
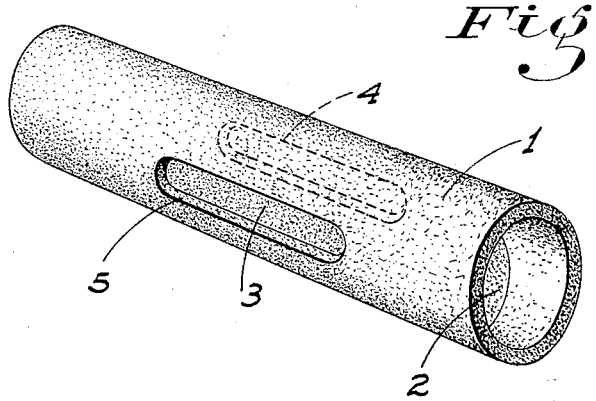
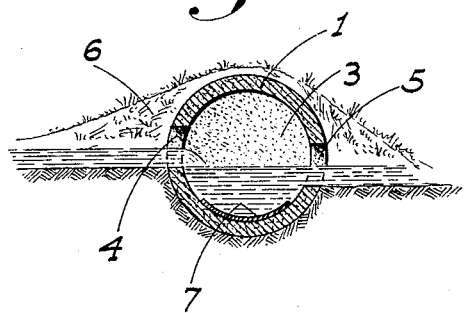
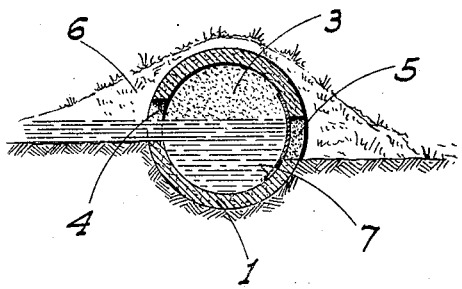
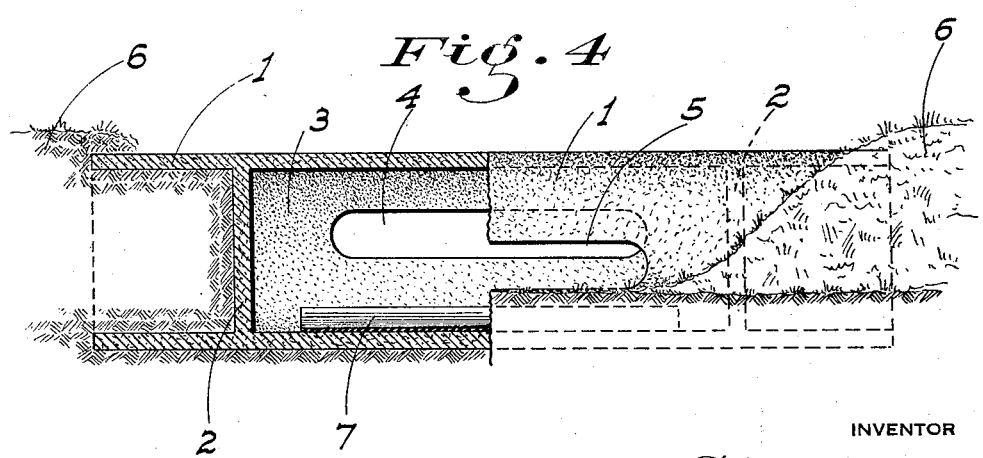
INVENTOR
W. R. Sherman
BY
ATTORNEY Patented Feb. 7, 1933

1,896,331

UNITED STATES PATENT OFFICE

WILLIAM R. SHERMAN, OF NEWMAN, CALIFORNIA

IRRIGATION GATE

Application filed April 22, 1932. Serial No. 606,828.

This invention relates to gates for use across irrigation ditches, in ditch banks, or to be interposed in check levees to control the flow of water between adjacent areas, or for other similar purposes to control a flow of water or other liquid.

The principal objects of my invention are to provide a gate of this general character so constructed that it may be easily installed in such a manner that it will be firmly maintained in place without possibility of erosion of the dirt and consequent leakage of the liquid past the end of the gate or below the same; one so constructed that the current of the flow of liquid through the gate from a higher to a lower level will be checked and erosion of the dirt on the intake or discharge side of the gate will be prevented; and one so shaped as to offer little interference with the passage of moving implements etc. or of animals over the gate; this being a feature of especial value when the gate is used in check or similar levees, in ditch banks etc.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a perspective view of my improved gate detached.

Fig. 2 is a transverse section of the gate as mounted in place in a check levee.

Fig. 3 is a similar view showing the gate closed.

Fig. 4 is a longitudinal elevation of the gate in place partly in section and looking at the discharge side of the gate.

Referring now more particularly to the characters of reference on the drawing, the gate comprises a tubular member 1 made of concrete, cast iron or other suitable material and of such dimensions as to enable stock shapes and sizes to be made use of. Formed or secured in the member 1 some distance from its ends are bulk heads 2 forming bottom closures for dirt receiving pockets open to the ends of the member 1, and a gate chamber 3 therebetween in which intake and discharge gate openings 4 and 5 respectively are provided. These openings are preferably in the form of horizontal slots, the bottom of the intake opening being somewhat below the level of the horizontal axis of the member 1 while the top of the discharge opening is about the same distance above the said axis. The gate may thus be set either side up while maintaining approximately the same relative positioning of the gate openings, except that the intake opening in one case will become the discharge opening in the other.

When installing the gate in a check levee 6 for instance the member 1 is depressed so that the bottom of the intake opening 4 is flush with the level of the ground of the relatively high area; the discharge opening 5 being then substantially on a level with the ground of the adjacent relatively low area as shown in Fig. 2. The possibility of water passing below the gate is therefore practically eliminated. The dirt at the ends of the levee cut fills the pockets in the member 1 outwardly of the bulk heads thus forming a continuous bond between the levee to points inwardly of the ends of the member 1, as shown in Fig. 4. In this manner erosion of dirt in the ends of the gate and leakage of water past the same is prevented.

When the gate is thus mounted a sump is formed inside the same below the level of the intake into which the water flows before it passes through the outlet. A water cushion is thus provided breaking the direct flow from the higher to the lower level and preventing erosion of the dirt adjacent the gate and beyond the discharge opening.

In order to close the gate when it is desired to prevent a passage of water therethrough I provide a shutter or closure member either on the outside of the intake opening or on the inside of the discharge opening. The closure shown in the drawing is of the latter form and consists of a rectangular sheet 7 substantially symmetrical to and of greater area than said opening. It is formed of resilient metal having a curvature approximately that of the interior of the member 1. The shutter may thus be easily moved from an open position clear of the opening 5, as shown in Fig. 2, to one closing said opening, as shown in Fig. 3; the pressure of the water from the intake side of the gate holding the shutter in its closed position.

When the gate is used across ditches, the openings would be approximately round instead of oblong. Also, in some instances, the gate would be used to prevent erosion or merely retard the flow of water. In such cases, the adjustable closure would be eliminated.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A liquid control gate comprising a tubular member adapted to be mounted with its longitudinal axis horizontal and transversely of the path of the flow of a liquid, said member having intake and discharge openings in its opposite sides above the bottom thereof, and an adjustable closure for one of said openings; said closure comprising a resilient curved plate inside the member adapted to be disposed over or clear of the discharge opening on the inner side thereof and of greater area than said opening.

2. A liquid control gate comprising a tubular member adapted to be mounted with its longitudinal axis horizontal and transversely of the path of the flow of a liquid, said member having intake and discharge openings in its opposite sides above the bottom thereof, and on relatively high and low levels respectively.

3. A liquid control gate comprising a member adapted to be mounted in position relative to a flow of liquid to form a bar to such flow, said member having intake and discharge openings in its opposite sides, means formed with said member between the openings to provide a liquid cushion and break the direct flow from the intake to the discharge opening, and an adjustable closure for one of said openings.

4. A liquid control gate comprising an open-ended tubular member adapted to be mounted with its longitudinal axis horizontal and transversely of the path of flow of a liquid, bulkheads in said member some distance from its ends, said member having intake and discharge openings in its opposite sides communicating with the area in the member between the bulkheads.

5. A liquid control gate comprising a member adapted to be mounted with its longitudinal axis horizontal and transversely of the path of the flow of a liquid, said member having intake and discharge openings in its opposite sides, and pockets formed in said member and open to the opposite ends thereof for the reception of dirt to bind the gate to the levee or equivalent structure in which said gate is interposed.

In testimony whereof I affix my signature.

WILLIAM R. SHERMAN.